UNITED STATES PATENT OFFICE.

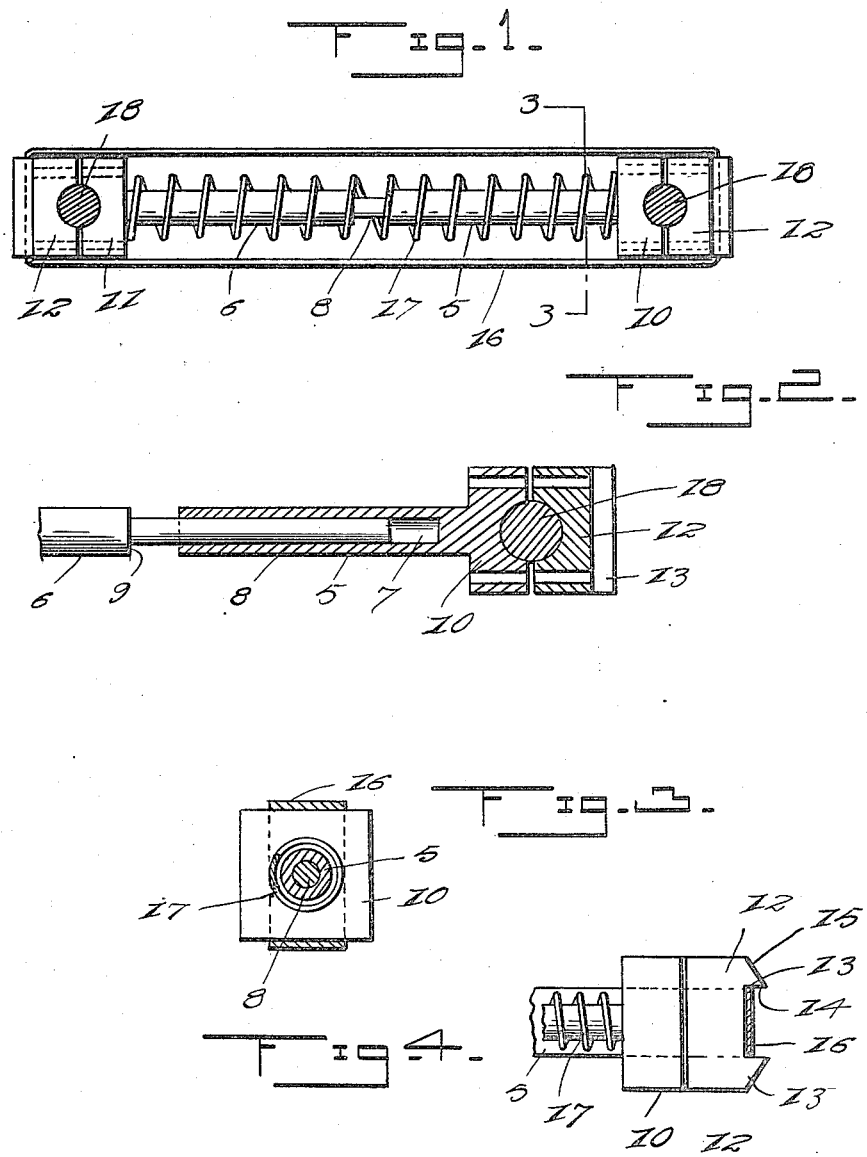

CHARLES E. BEDRANG, OF MONUMENT, KANSAS.

CONNECTING-ROD.

1,226,447. Specification of Letters Patent. Patented May 15, 1917.

Application filed September 9, 1916. Serial No. 119,259.

*To all whom it may concern:*

Be it known that I, CHARLES E. BEDRANG, a citizen of the United States, residing at Monument, in the county of Logan and State of Kansas, have invented certain new and useful Improvements in Connecting-Rods; and I do hereby declare the following to be a full, clear, and exact description of the invention, such as will enable others skilled in the art to which it appertains to make and use the same.

This invention has for its object to provide an improved connecting rod primarily designed for use in connection with pumps, mowers and other machinery where reciprocating motion is employed.

Another object is the provision of an improved connecting rod which is so constructed as to automatically yield or shorten when the reciprocating parts of the machine meet an obstruction and their reciprocatory movement is temporarily stopped.

Another object is the provision of a connecting rod in which the bearing caps are resiliently retained in engagement with the pins carried by the rotary and reciprocating parts of the machine to compensate for wear and eliminate the noise incident to the movement of loose parts.

With these and other objects in view, the invention consists in the novel construction, combination and arrangement of parts as will be hereinafter specifically described, claimed and illustrated in the accompanying drawing, in which:

Figure 1 represents a side elevation of the improved connecting rod, partly in section, Fig. 2 represents an enlarged sectional view through one section of the connecting rod, the other section being broken away, Fig. 3 represents a transverse sectional view on the line 3—3 of Fig. 1, and Fig. 4 represents a fragmentary plan view, partly in section, of the connecting rod.

Referring to the drawing in detail, wherein similar reference numerals designate corresponding parts throughout the several views, the numerals 5 and 6 indicate the sections of the connecting rod, the section 5 being formed with an axial recess 7, receiving the reduced extension 8 of the other section 6. The shoulder 9 defined by the reduced terminal 8 of the section 6 constitutes a stop for engagement with the adjacent terminal of the section 5 to limit the inward movement of the two sections.

The connecting rod section 5 is formed with an integral bearing member 10, and the section 6 is formed with an integral bearing member 11, identical in construction to the bearing member 10. Bearing caps 12 are fitted over the bearing members 10 and 11 and coöperate therewith to connect the opposite terminals of the connecting rod sections with the parts of the machine to be connected.

Each bearing cap 12 is formed with a pair of spaced lugs 13, parallel inner surfaces 14 and inclined outer surfaces 15. A rectangular band 16, corresponding in width to the distance between the lugs 13 of each cap is positioned between the latter and limits the relative outward movement of the bearing caps 12 and the connecting rod sections 5 and 6.

An expansion spring 17 is coiled about the two connecting rod sections 5 and 6, is confined between the bearing members 10 and 11 carried thereby, and normally tends to move the latter into engagement with the pins 18 positioned between the bearing members and bearing caps at the opposite ends of the connecting rod structure.

In use, when either of the parts of the machine with which the connecting rod is connected meets an obstruction and is abruptly stopped, it is evident that the sections 5 and 6 will move together against the tension of the spring 17 and prevent breakage of the parts of the machine. When the obstruction is removed the bearing members 11 are automatically restored to their normal position by the tension of the spring 17. The inward movement of either bearing member 10 or 11 with relation to its coöperating bearing cap 12 is guided by the band 16. The band 16 may be removed, when necessary, to replace or repair the parts of the connecting rod and it may be conveniently replaced by slipping the end members thereof over the inclined faces 15 of the lugs 13 into position between the latter.

What I claim is:

1. A connecting rod including a pair of longitudinally freely movable sections, said sections having bearings at their opposite ends, means normally tending to separate said sections, and an endless band positioned about the bearings for limiting the outward movements thereof.

2. A connecting rod including a pair of sections having telescoping inner ends, said telescoping ends being freely movable longitudinally, said sections having bearing members at their opposite ends, caps fitted over said bearing members, spring means normally tending to separate said sections, and means for limiting the outward movements of said sections.

3. A connecting rod including a pair of sections having telescoping inner terminals, said telescoping ends being freely movable longitudinally, said sections having bearing members at their opposite ends, bearing caps positioned over said bearing members, spring means normally tending to separate said sections, and means for limiting the outward movements of said sections, said sections having means for limiting the inward movements of said sections.

4. A connecting rod including a pair of sections having telescoping inner ends, said inner ends being freely movable, said sections having bearing members at their outer ends, means normally tending to separate said sections, caps fitted over said bearing members, said caps having spaced lugs, said lugs having inclined outer surfaces and parallel inner surfaces, and an endless rectangular band confined between the lugs of the bearing caps and confining the latter.

5. A connecting rod including a pair of sections having telescoping inner terminals, said telescoping inner terminals having smooth bearing surfaces, whereby said sections are freely movable in relation to each other, fixed bearing members carried by the outer terminals of said sections, bearing caps positioned over said bearing members, a band positioned over said bearings for confining and limiting the outward movements of the latter, and a coil spring positioned around said telescoping members and having its opposite ends bearing against said bearing members normally tending to separate said telescoping sections.

In testimony whereof I affix my signature in presence of two witnesses.

CHARLES E. BEDRANG.

Witnesses:
V. JAGGAR,
H. JAGGAR.

Copies of this patent may be obtained for five cents each, by addressing the "Commissioner of Patents, Washington, D. C."